United States Patent [19]

Grube et al.

[11] Patent Number: 5,724,655
[45] Date of Patent: Mar. 3, 1998

[54] METHOD AND APPARATUS FOR OPERATING A COMMUNICATION UNIT CONSISTING OF MULTIPLE DEVICES

[75] Inventors: Gary W. Grube, Palatine; Timothy W. Markison, Hoffman Estates, both of Ill.

[73] Assignee: Motorola, Inc., Schaumburg, Ill.

[21] Appl. No.: 531,958

[22] Filed: Sep. 21, 1995

Related U.S. Application Data

[63] Continuation of Ser. No. 226,740, Apr. 12, 1994, abandoned.

[51] Int. Cl.$^6$ .................................... H04Q 7/32
[52] U.S. Cl. .................................... 455/419; 455/558
[58] Field of Search .................. 379/56, 58, 59, 379/61, 63, 357; 380/21; 455/33.1, 54.1, 54.2, 90, 403, 422, 550, 575, 418, 419, 420, 558

[56] References Cited

U.S. PATENT DOCUMENTS

| | | | |
|---|---|---|---|
| 4,672,601 | 6/1987 | Abley | 379/63 |
| 4,757,553 | 7/1988 | Crimmins | 379/56 |
| 4,969,205 | 11/1990 | Itoh | 379/61 |
| 5,051,741 | 9/1991 | Wesby | 340/825.49 |
| 5,054,051 | 10/1991 | Hoff | 379/56 |
| 5,127,042 | 6/1992 | Gillig et al. | 379/59 |
| 5,241,410 | 8/1993 | Streck et al. | 379/56 |
| 5,335,276 | 8/1994 | Thompson et al. | 380/21 |
| 5,402,104 | 3/1995 | LaRosa . | |
| 5,442,680 | 8/1995 | Schellinger et al. | 379/58 |
| 5,602,854 | 2/1997 | Luse et al. | 455/54.1 X |

*Primary Examiner*—Dwayne Bost
*Assistant Examiner*—William G. Trost
*Attorney, Agent, or Firm*—Susan L. Lukasik

[57] ABSTRACT

In a wireless communication system (100), a communication unit (102) may operate in the following manner. Upon initiation of a service request, the communication unit (102) transmits the desired service request to an application device (115) over a second wireless communication path (117). Upon receiving this request, the application device (115) prepares a service response which is transmitted back to the communication unit (102) over the second wireless communication path (117). Upon receiving the response, the communication unit (102) transmits at least a portion of the response to the wireless communication system (100).

16 Claims, 3 Drawing Sheets

5,724,655

1

METHOD AND APPARATUS FOR OPERATING A COMMUNICATION UNIT CONSISTING OF MULTIPLE DEVICES

This is a continuation of application Ser. No. 08/226,740, filed Apr. 12, 1994, and now abandoned.

FIELD OF THE INVENTION

This invention relates generally to wireless communication systems, and, in particular, to a communication apparatus and method of operation in such wireless communication system.

BACKGROUND OF THE INVENTION

Wireless communication systems are known to include a communication resource allocator, a plurality of communication units, and communication resources that are transceived via repeaters. In normal operation, an operator of a communication unit employs an input device, typically a keypad or selection switch, to select a desired system service. Upon this selection, the communication unit accesses its internal memory to determine the software application needed to execute this request. Having determined this information, a processor within the communication unit utilizes the software application to prepare an inbound signaling word (ISW) which contains the communication unit's identification code and the service request. This ISW is then transmitted, under the control of the microprocessor which is executing the appropriate software program, over a communication resource to the communication resource allocator, or central controller. The central controller interprets the request and determines whether the communication unit is authorized and whether the request is valid for this communication unit. If both inquiries are answered affirmatively, the central controller transmits an outbound signaling word (OSW) over a communication resource back to the communication unit. Upon receiving this OSW, the communication unit again utilizes its microprocessor and appropriate software algorithm to interpret the OSW.

As is known, technology within the wireless communication arena is advancing very rapidly. Recent technology trends are toward having the communication units becoming more and more software dependent and better processors of the software applications. With this trend, it is difficult for a communication unit to keep up with the latest versions of software and processors. The latest versions of software provide enhanced system access features, such as telephone interconnect, dynamic regrouping, private calling, emergency processing, and a variety of other features, while the latest processors allow this services to be processed more quickly.

When the software applications change within a communication unit, that unit often needs to be replaced because it has insufficient memory to accommodate the new software applications or, at a minimum, must be brought into a service shop to be updated with the newest version of the software applications. While this provides the communication unit with the latest software applications, it is burdensome and time consuming both to the communication unit operator and the communication system operator. When the processor needs to be updated, the entire communication unit needs to be replaced.

One solution that is currently being used within other software driven arts, such as computers, personal electronic organizers, is to have the software applications on a disk or

2 card. To utilize the software contained on the card, the card must be inserted into the computer, or personal organizer. While this provides the flexibility of increasing the software applications, if the device is lost, both the hardware apparatus portion and the software applications are lost. Thus, someone who finds the device has a complete working unit and may proceed to utilize that unit.

Therefore, a need exists for a method and apparatus that allows easy updates of software applications and processors within communication units without the burdens of prior art techniques.

DESCRIPTION OF A PREFERRED EMBODIMENT

Generally, the present invention provides a method and apparatus for operating a communication unit within a wireless communication system. This is accomplished by providing an application device which contains the main processor for the communication unit as well as most of if not all of the necessary memory. In operation, when a service request is initiated by an operator of the communication unit, the communication unit transmits the request to the application device via a second wireless communication path. Upon receiving this request, the application device processes the request and transmits a response back to the communication unit over the second wireless communication path. If necessary, the communication unit transmits at least a portion of this response to the central controller via a first wireless communication path. With such a method and apparatus, the present invention provides a convenient way for updating communication unit software and processors without the burdens of prior art techniques.

Figure 1:
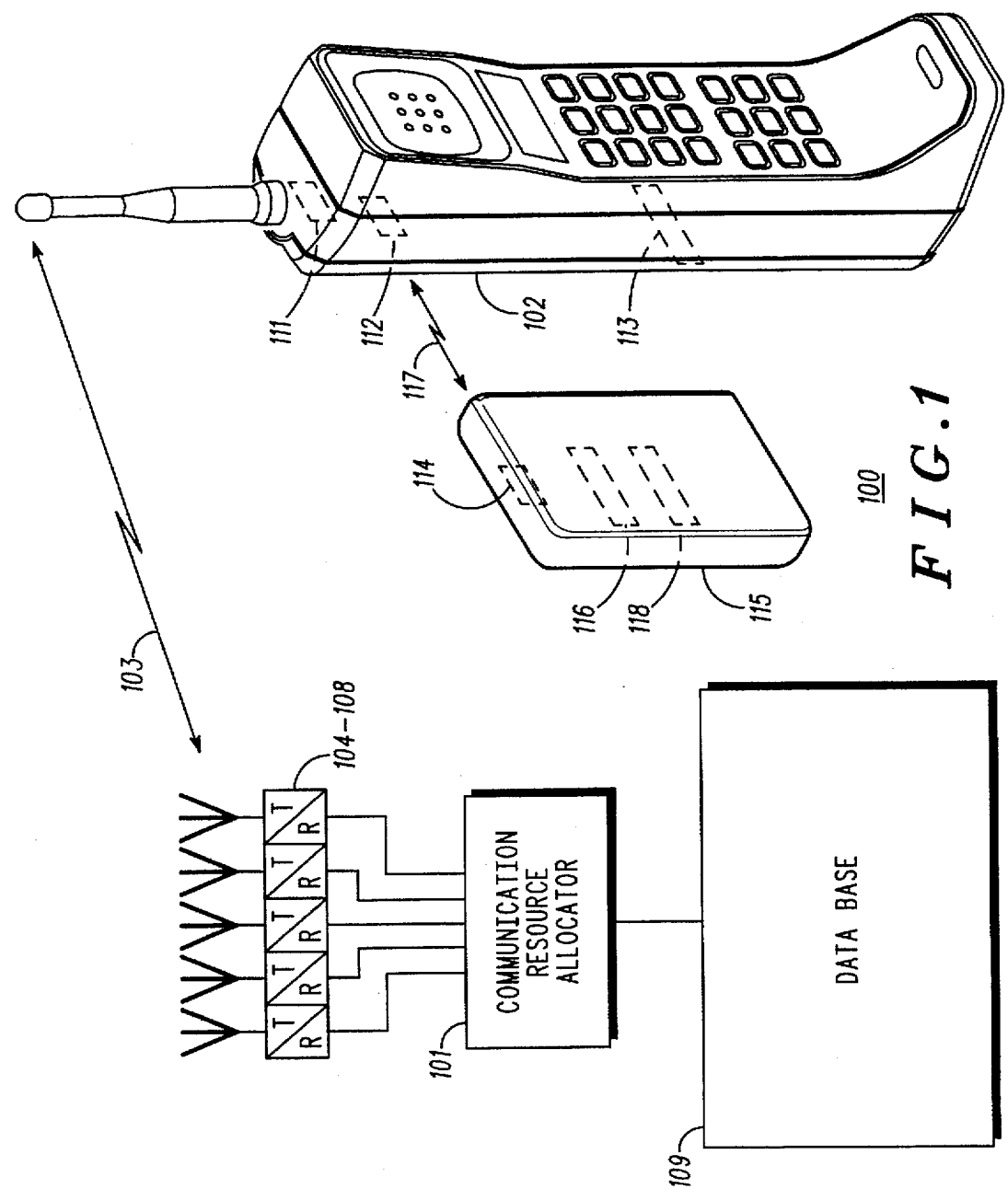
FIG. 1 illustrates a wireless communication system in accordance with the present invention.

The present invention can be more fully described with reference to FIGS. 1-3. FIG. 1 illustrates a wireless communication system (100) that includes a communication resource allocator, or central controller (101), a plurality of communication units (102), communication resources (103), repeaters (104-108), and a database (109). The communication unit (102) includes a first transceiver (111), a second transceiver (112), and a processor (113). The first transceiver (111) allows the communication unit to transceive information, over the communication resources (103) or first communication path, with the central controller (101). The second transceiver (112) allows the communication unit to transceive, over a second wireless communication path, application information with the application device (115). The processor (113), which may be any device capable of executing a set of operational instructions, is provided to process the input requests from the operator of the communication unit and to process information received from the central controller. This processing involves preparing necessary messages to transmit to the application device. For example, if the operator of the communication device initiates a group call, the processor (113) interprets this group call and prepares a group call initiated message which is transmitted to the application device (115).

The application device (115) is a physically small device that is readily carried about the person and contains an application transceiver (114), an application storage device (116), and a processor (118). The application storage device (116), which may be any type of device that stores digital information, stores the software applications for the communication unit. As mentioned, the software application may be group calling, private calling, telephone interconnect, or any other system service. The storage device (116) also stores a unique identification code for the application device (115) which is transmitted and verified for each conveyance of information with the communication unit over the second wireless communication path (117). The processor (118), communication unit (102). To illustrate how the application which may be a device that performs a series of operational instructions, performs the bulk of the processing for the communication unit (102). To illustrate how the application device (115) and the communication unit (102) inter operate within the wireless information system (100) consider the logic diagram of FIGS. 2 and 3.

Figure 2:
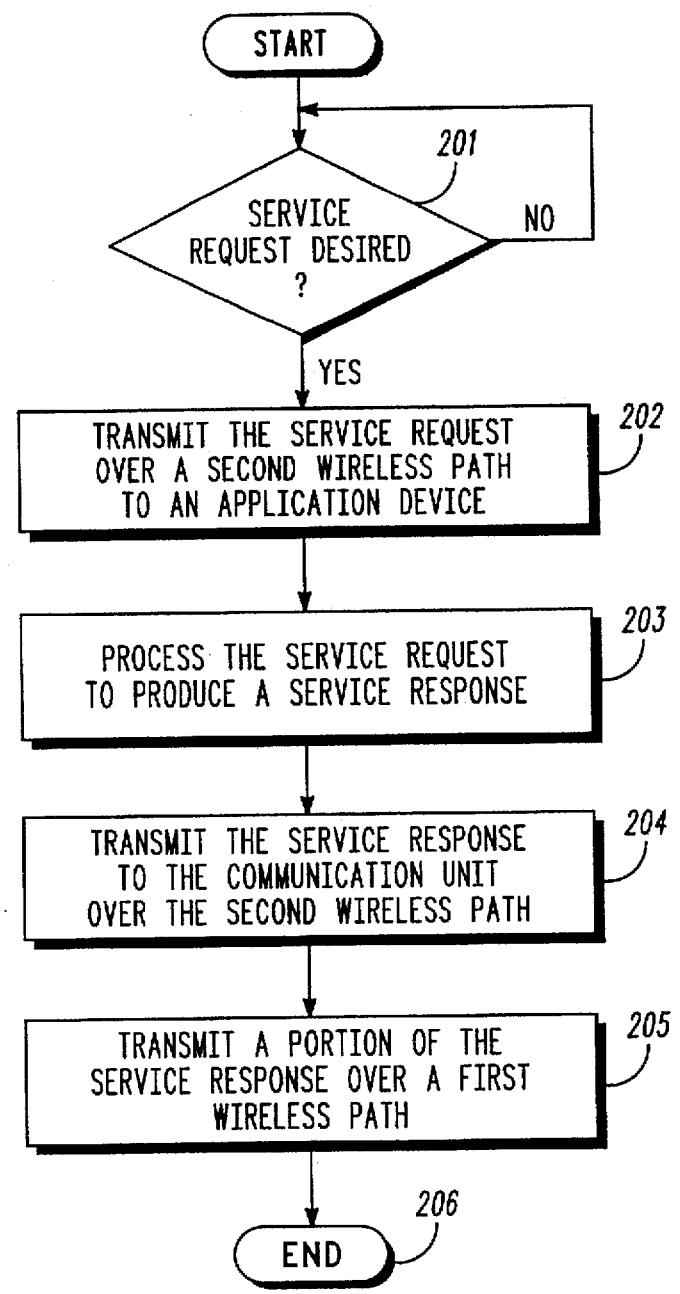
FIG. 2 illustrates a logic diagram that may be used to implement the present invention.

FIG. 2 illustrates a logic diagram that may be used to implement the present invention. At step (201), the communication unit determines whether a service request is desired. This determination may be based on receiving an input signal from a keyboard or a selector switch which indicates the particular service request desired. If a service request is desired (201), a desired service request message is transmitted over a second wireless communication path to the application device, wherein the message includes the unique ID of the communication unit and the particular type of service requested. The ID used by the communication unit may be the unique ID used to access the system, or in the preferred embodiment is a different ID.

The second wireless communication path (117) may be a RF communication path or an infrared communication path. If the second wireless communication path is an RF communication path, the frequency may be identical to the first communication path wherein the transmit powers of both the application device and the second transceiver (112) of the communication unit are set to a very low power level such that the range between the two devices is approximately 20 feet. Alternatively, the frequency may be selected to any RF frequency that is available for commercial use. If the second wireless communication path is an infrared path, the application device transceiver (114) and the second transceiver (112) should include a light receptacle and light transmitter preferably a wide angle lens such that the angle of transmission may be as broad as possible.

Regardless of the type of second wireless communication path, upon receiving the desired service request message, the application device processes this request to produce a service response (203). This processing includes verifying that the ID sent by the communication unit matches the ID of the application device. If the IDs do not match, the service response will be a denial message. If, however, the IDs match, the application device processes the message by determining the appropriate software application to access. Having determined this, the application device, via its processor, executes the application to prepare a response. The response includes header information and an action required by the communication unit. The header includes the communication unit unique identification code, while the action includes an ISW and what should be done with the ISW. For example, if the service requested was for a telephone interconnect call, a group call, emergency call, private call, a data communication, and also the action required the action required is essentially the same: transmit the ISW prepared by the application device to the central controller via the first wireless communication path. Having prepared the service response, the application device transmits the response to the communication unit over the second wireless communication path (204). Upon receiving this information, the communication unit transmits at least a portion of this response (based on the action indicated) to the central controller over a first wireless communication path (205). Upon doing this, the process ends (206) for this particular service request.

Figure 3:
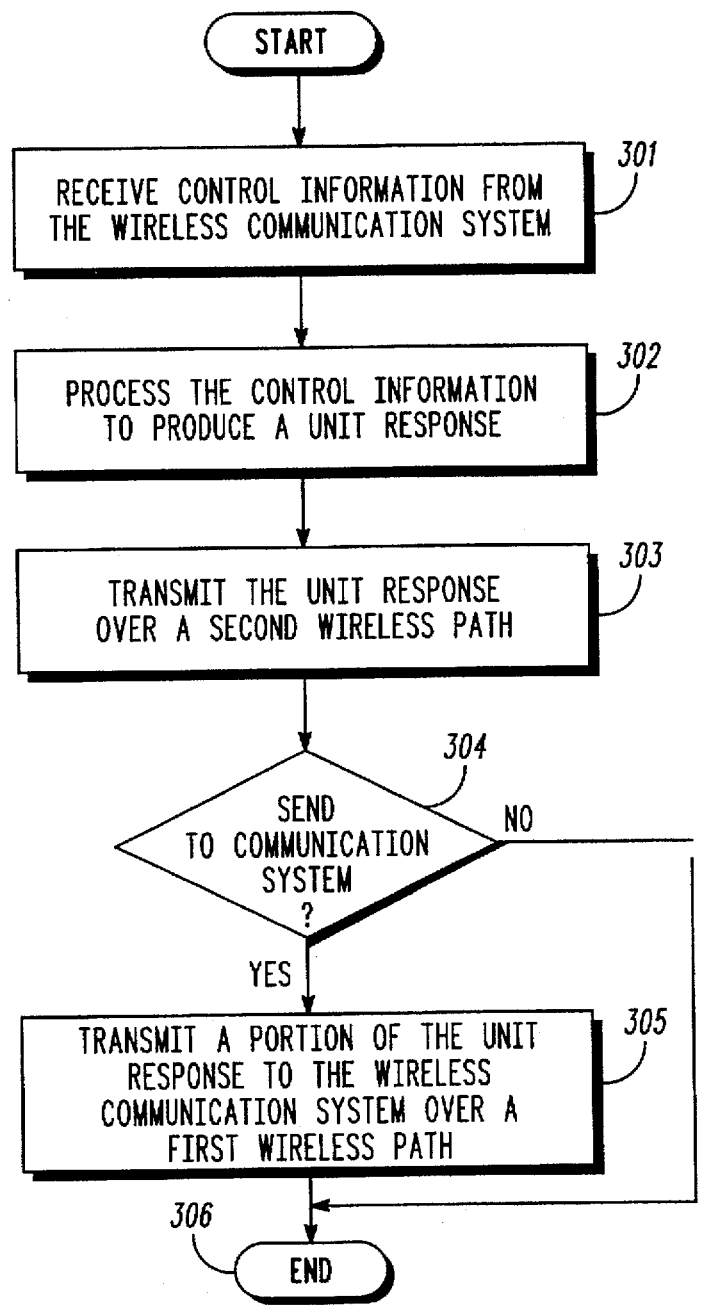
FIG. 3 illustrates a logic diagram that may be used to implement a continuing embodiment of the present invention.

FIG. 3 illustrates a logic diagram for implementing a continuing embodiment to the present invention. In step (301), the communication unit receives control information from the wireless communication system (301). This information is typically an OSW transmitted by the central controller. The communication unit routes this information, unaltered, to the application device which processes the control information to produce a unit response (302). The unit response is a typical response to any OSW as presently done in wireless communication systems. Having prepared the unit response, the application device transmits the response to the communication unit over the second wireless communication path (303). Upon receiving the response, the communication unit determines whether at least a portion of the response needs to be transmitted to the communication system (304). If no information needs to be transmitted the process ends (306). If, however, at least a portion needs to be transmitted, the communication unit transmits a portion of the unit response to the wireless communication system over a first wireless communication path (305).

The present invention, while not changing the functionality from a user standpoint, has dramatically changed the operation from a system architecture standpoint. In the present invention, the application device is in a sense "the brains" of the communication unit, and the communication unit is merely the vehicle which allows the application device to communicate with the wireless communication system. By separating the "brains" of the communication unit the radio frequency hardware, updates in software applications as well as processing equipment can be readily made without having to replace the communication unit. By doing this, the users of such communication devices save a substantial amount of money and are provided with enhanced services.

We claim:

1. A wireless communication system for a communication unit comprising:

a wireless communication unit that includes a communication processor, a first transceiver that transceives information with a communication system on a first wireless communication path and a second transceiver that transceives unit control information with an application device on a second wireless communication path; and an application device that includes an application storage element, an application processor, and a transceiver that transceives the unit control information to the communication unit on the second wireless communication path, wherein the application device is a device separate from the wireless communication unit, and wherein the application processor performs the bulk of the processing for the wireless communication unit.

2. The communication system of claim 1, wherein the second wireless communication path comprises an infrared communication path.

3. The communication system of claim 1, wherein the second wireless communication path comprises an RF communication path.

4. The communication system of claim 1, wherein the unit control information transmitted by the communication unit comprises a request for an application to be performed by the application device.

5. The communication system of claim 4, wherein the application is a group dispatch application, a telephone interconnect application, a data communication application, a private call application, or an emergency call application.

6. The communication system of claim 1, wherein the unit control information transmitted by the application device comprises information for the communication unit to transmit to a central controller over the first wireless communication path.

7. The communication system of claim 1, wherein the communication unit routes information received on the first wireless communication path to the application device via the second wireless communication path.

8. A method for operating a communication unit in a wireless communication system, the method comprising the steps of:

a) ascertaining, by the communication unit, that a service request is desired to produce a desired service request;

b) transmitting, by the communication unit, an indication of the desired service request to an application device over a second wireless communication path;

c) processing, by the application device, the desired service request to produce a service response;

d) transmitting, by the application device, the service response to the communication unit over the second wireless communication path, wherein the service response includes an inbound signaling word; and e) when indicated by the service response, transmitting, by the communication unit, at least a portion of the service response, comprising at least the inbound signaling word, to the wireless communication system on a first wireless communication path, wherein the application device is a device separate from the communication unit.

9. The method of claim 8, further comprising the step of transmitting on the second wireless communication path, wherein the second wireless communication path comprises an infrared communication path.

10. The method of claim 8, further comprising the step of transmitting on the second wireless communication path, wherein the second wireless communication path comprises an RF communication path.

11. The method of claim 8, further comprising the step of operating the first wireless communication path at a first set of frequencies at a first power level and operating the second wireless communication path at the first set of frequencies at a second power level, wherein the first power level is substantially greater than the second power level.

12. The method of claim 8, wherein step (c) further comprises processing the service response to include a header and the service request, and wherein the service request indicates at least one action to be performed by the communication unit.

13. An wireless communication system comprising:

a communication unit, comprising a first processor, a first transceiver that transceives system control information with a communication system on a first communication path, and a second transceiver that transceives local control information with an application device on a second communication path, wherein the second communication path is a wireless communication path;

an application device comprising an application storage element, a second processor, and an application device transceiver that transceives the local control information to the communication unit on the second communication path, wherein the application device is a device separate from the wireless communication unit, and wherein the second processor serves as the main processor for the communication unit.

14. The wireless communication system of claim 13, wherein the application storage element stores most of the necessary memory for the communication unit.

15. The wireless communication system of claim 13, wherein the application storage element stores software applications for the communication unit.

16. The wireless communication system of claim 15, wherein updates in the software applications are made without having to replace the communication unit.

\* \* \* \* \*